United States Patent
Chang et al.

(10) Patent No.: US 6,455,192 B1
(45) Date of Patent: Sep. 24, 2002

(54) BATTERY CASE

(75) Inventors: Yoon-han Chang, Kyungki-do; Oh-young Hyun, Daejeon, both of (KR)

(73) Assignee: Samsung SDI Co., Ltd., Kyungki-do (KR)

( * ) Notice: Subject to any disclaimer, the term of this patent is extended or adjusted under 35 U.S.C. 154(b) by 51 days.

(21) Appl. No.: 09/695,857

(22) Filed: Oct. 26, 2000

(30) Foreign Application Priority Data

Nov. 9, 1999 (KR) .............................. 99-49414

(51) Int. Cl.[7] .............................. H01M 2/02; H01M 2/08
(52) U.S. Cl. ................... 429/176; 429/127; 429/177
(58) Field of Search ..................... 429/174, 176, 429/177, 179, 127

(56) References Cited

U.S. PATENT DOCUMENTS

| | | | |
|---|---|---|---|
| 4,758,482 A | * | 7/1988 | Yamana et al. ............... 429/53 |
| 6,004,693 A | * | 12/1999 | Fukuda et al. .............. 429/176 |
| 6,048,638 A | * | 4/2000 | Pendalwar .................. 429/127 |
| 6,371,996 B1 | * | 4/2002 | Takayama et al. ......... 29/623.2 |

FOREIGN PATENT DOCUMENTS

| | | | |
|---|---|---|---|
| JP | 5-67456 | * | 3/1993 |
| JP | 11-67168 | | 3/1999 |
| JP | 11-242953 | | 9/1999 |

* cited by examiner

*Primary Examiner*—Carol Chaney
*Assistant Examiner*—Tracy Dove
(74) *Attorney, Agent, or Firm*—Leydig, Voit & Mayer, Ltd.

(57) ABSTRACT

A battery case for enclosing and hermetically sealing a battery body which generates current. The case includes a first polyethylene terephthalate layer, which is an innermost layer with respect to a battery body, which is adhered to another part of the same layer when sealing the battery body, a polymer layer on the first polyethylene terephthalate layer, a second polyethylene terephthalate layer on the polymer layer, and a polypropylene layer, which is an outermost layer with respect to the battery body, on the second polyethylene terephthalate layer. Therefore, short circuits generated during adhesion between edges of upper and lower portions of the case can be prevented, improving the case sealing process. Also, the deterioration of battery performance, due to a micro short circuit occurring during the sealing of the case, can be avoided. Further, the case sealing process can be safely performed, irrespective of conditions of thermal fusion such as temperature, pressure, and time.

4 Claims, 2 Drawing Sheets

BATTERY CASE

BACKGROUND OF THE INVENTION

1. Field of the Invention

The present invention relates to case of a battery, and more particularly, to a case of a battery which hermetically seals and surrounds a battery body that generates current.

2. Description of the Related Art

According to the kind of electrolyte used, a lithium secondary battery can be classified as a lithium ion battery which uses a liquid electrolyte or a lithium ion polymer battery which uses a solid electrolyte.

The lithium ion polymer battery includes a battery body for generating current, which is made by stacking a cathode, an anode and a separator. An electrode terminal serving as an electrical path to the outside is connected to the battery body. Parts of the battery body and the electrode terminal are hermetically sealed in an insulating case. The case of the lithium ion polymer battery hermetically seals the battery body such that thermal adhesive material layers in the innermost layer of the battery body are adhered to each other.

FIG. 1 is an exploded perspective view showing an example of a conventional lithium ion polymer battery. Referring to FIG. 1, the lithium ion polymer battery includes an electrode assembly 11 having a cathode, an anode and a separator, and a case 12 surrounding the electrode assembly 11 to hermetically seal the same. Electrode terminals (or leads) 14 and 14' serving as an electrical path for conducting the current generated in the electrode assembly 11 to the outside are installed such that a predetermined length of the same is exposed outside the case 12.

The case 12 is an insulating film having a laminated structure shown in FIG. 2. Referring to FIG. 2, the case 12 is constructed such that a poly(ethylene-co-acrylic acid) (EAA) layer 21 which is a thermal adhesive material layer is formed as the innermost layer with respect a to battery body 20, a polyethylene (PE) layer 22, a nylon layer 23, an EAA layer 21' and an aluminum layer 24 are sequentially laminated thereon, and then a nylon layer 23' is laminated as the outermost layer. Here, the PE layer 22 increases the insulation and adhesion effects. The EAA layer 21' prevents the case 12 from swelling due to an electrolytic solution. The aluminum layer 24 prevents permeation of moisture and loss of an electrolyte solution. The nylon layer 23 prevents cracks from being generated at the outer layers and facilitates the formability of the inner layers.

The above-described case 12 hermetically seals the battery such that the electrode assembly 11 is inserted into the case 12, with only parts of the electrode terminals 14 and 14' being exposed. Then, heat and pressure are applied to the case 12 to hermetically seal the battery such that thermally adhesive materials of the edges in the upper and lower case bodies are adhered to each other.

However, during heat-fusion of the edges of the upper and lower case bodies, if the temperature and pressure are so high that too much time is required in the heat-fusion, an EAA layer, which is a polymer layer on the case surface is melted, so that anodic and cathodic leads of the battery are brought into contact with aluminum, which is a case material, to cause a short circuit, resulting in degradation in assembly efficiency. Also, in the case where a micro short circuit occurs, the performance of the battery may be degraded.

SUMMARY OF THE INVENTION

To solve the above problems, it is an object of the present invention to provide a battery case capable of preventing a short circuit of the battery during heat-fusion.

To accomplish the above objective, the present invention provides a case of a battery for enclosing and hermetically sealing a battery body which generates current, the case including a first polyethylene terephthalate layer which is an innermost layer in view of a battery body and which is adhered to other part thereof when sealing the battery body, a polymer layer formed on the first polyethylene terephthalate layer, a second polyethylene terephthalate layer formed on the polymer layer, and a polypropylene layer which is an outermost layer in view of the battery body and formed on the second polyethylene terephthalate layer.

The polymer layer is preferably at least one selected from the group consisting of polytetrafluoroethylene (PTFE) resin, polyimide resin and silicon resin. This is because these materials have excellent heat resistance, oxidation resistance and chemical resistance and have low air permeability, thereby suppressing permeation of moisture and loss of an electrolytic solution. Also, the thickness of the polymer layer is preferably in the range of 10 to 50 μm.

BRIEF DESCRIPTION OF THE DRAWINGS

The above objectives and advantages of the present invention will become more apparent by describing in detail a preferred embodiment thereof with reference to the attached drawings in which.

DESCRIPTION OF THE PREFERRED EMBODIMENT

Figure 1:
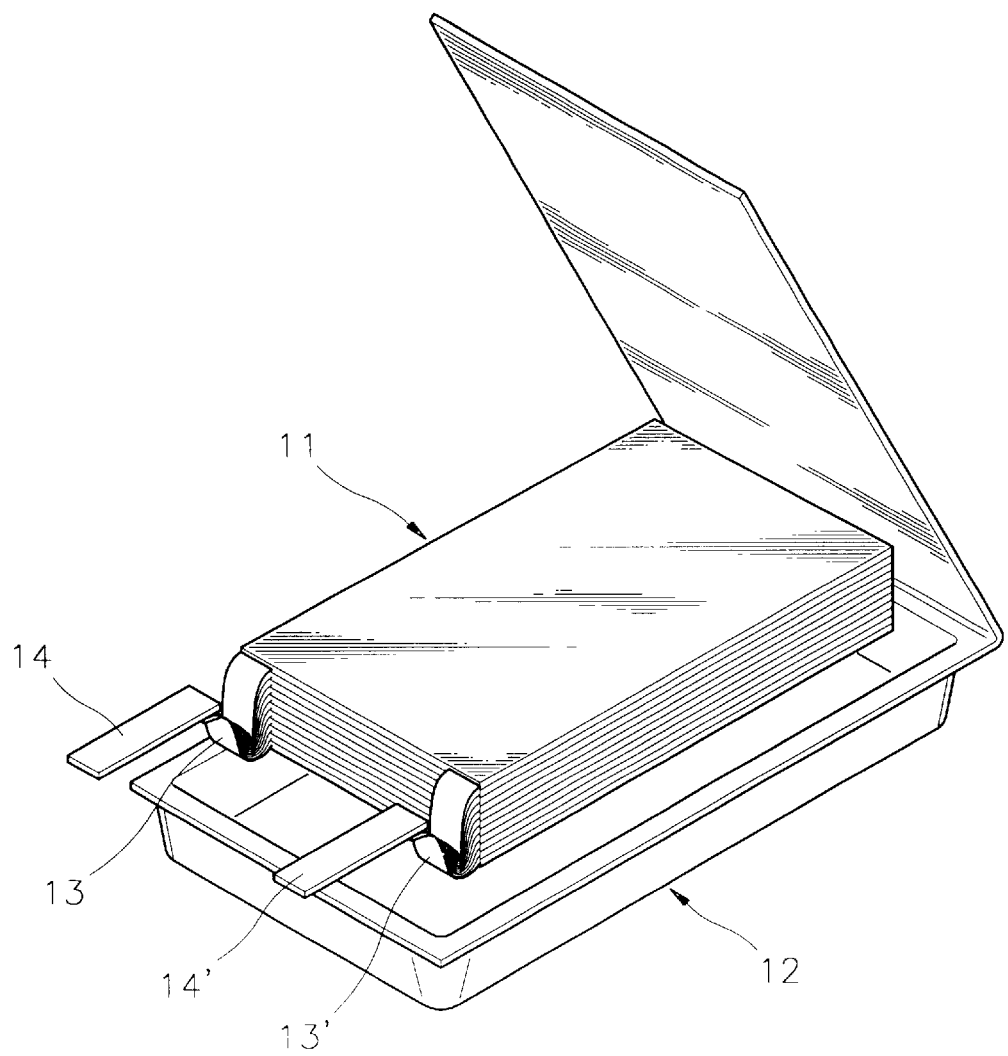
FIG. 1 is an exploded perspective view showing an example of a conventional lithium ion polymer battery.
Figure 2:
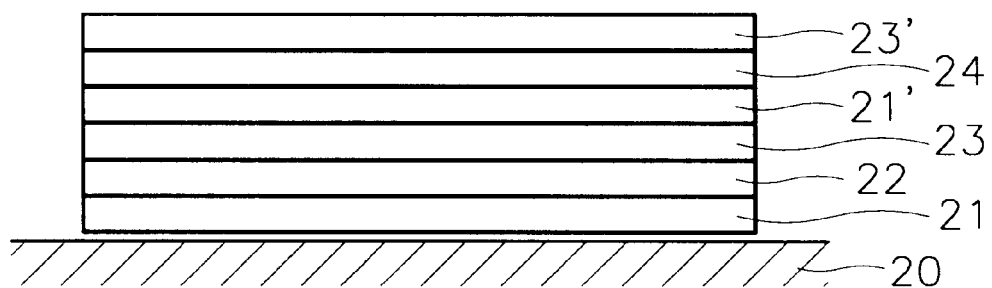
FIG. 2 is a cross-sectional view showing a case of the conventional lithium ion polymer battery shown in FIG. 1.
Figure 3:
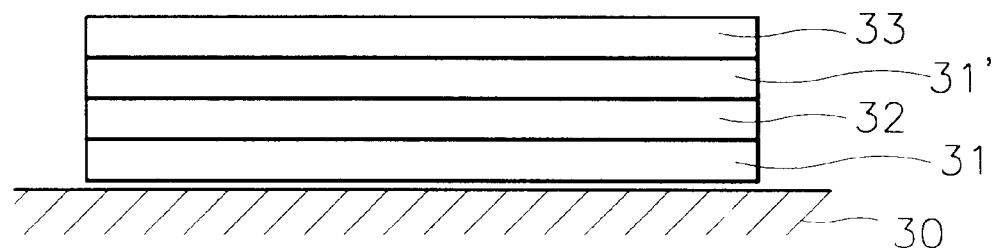
FIG. 3 is a cross-sectional view showing a case of a lithium secondary battery according to the present invention.

FIG. 3 is a cross-sectional view of a case of a battery according to the present invention.

Referring to FIG. 3, the battery case for enclosing a battery body 30 which current is generated and hermetically sealing the same, includes a first polyethylene terephthalate layer 31 as the innermost with respect to the battery body 30. The first polyethylene terephthalate layer 31 is thermally adhered to another part of the same layer to hermetically seal the battery. A polypropylene layer 33 is provided as the outermost layer with respect to the battery body 30. The polypropylene layer 33 protects inner layers from external shock, and prevents cracks from being generated on the outer surface of the battery, thereby facilitating the overall formability. The polypropylene layer 33 is preferably polypropylene suitable for a high temperature, having excellent heat resistance.

A polymer layer 32 for preventing permeation of moisture and loss of an electrolyte solution is formed on the first polyethylene terephthalate layer 31. A second polyethylene terephthalate layer 31' for adhering the polymer layer 32 to the polypropylene layer 33 is formed on the polymer layer 32.

The polymer layer 32 is preferably at least one material selected from the group consisting of polytetrafluoroethylene (PTFE) resin, polyimide resin and silicone resin, which is because these materials have excellent heat resistance, oxidation resistance, and chemical resistance and low air permeability.

The thicknesses of the respective layers of the case having a stacked structure will now be described.

The thickness of the first polyethylene terephthalate layer 31 is in the range of 10 to 30 μm, the thickness of the polymer layer 32 is in the range of 10 to 50 μm, the thickness of the second polyethylene terephthalate layer 31' is in the range of 10 to 30 μm, and the thickness of the polypropylene layer 33 is in the range of 10 to 20 μm. Here, if the thickness of the polymer layer 32 is less than 10 μm, it is difficult to attain reasonable formability. If the thickness of the polymer layer 32 is greater than 50 μm, the thickness of a case pouch having a laminated structure increases and thus the thickness of the battery itself is undesirably increased.

The aforementioned battery case can be widely applied and is particularly advantageously used in lithium ion polymer batteries.

The present invention will be described in more detail below by referring to the following example, but the invention is not limited to the example.

EXAMPLE

A case of a lithium ion battery was fabricated by sequentially laminating a 50 μm thick PTFE layer, a 20 μm thick polyethylene terephthalate layer, and a 15 μm thick polypropylene layer on a 20 μm thick polyethylene terephthalate layer, which is an innermost layer with respect to a battery body.

Comparative Example

A case of a lithium ion battery was fabricated by sequentially laminating a 15 μm thick PE layer, a 25 μm thick nylon layer, a 15 μm thick EAA layer, a 50 μm thick aluminum layer, and a 25 μm thick nylon layer on a 15 μm thick EAA layer which is an innermost layer with respect to a battery body.

The cases fabricated according to Example and Comparative Example were thermally fused under the conditions shown in Table 1 to measure battery assembly efficiency, and the result thereof is also shown in Table 1.

TABLE 1

| | Conditions of thermal fusion | | | |
| --- | --- | --- | --- | --- |
| | Temperature (° C.) | Pressure (bar) | Time (sec) | Battery assembly efficiency (%) |
| Example | 160 | 3 | 2 | 100 |
| | 170 | 3 | 3 | 100 |
| | 180 | 3 | 4 | 100 |
| Comparative Example | 160 | 3 | 2 | 87 |
| | 170 | 3 | 3 | 70 |
| | 180 | 3 | 4 | 63 |

As shown in Table 1, according to Comparative Example, as the temperature and time were increased, the battery assembly efficiency was lowered. This is because the EAA layer, which is the innermost layer of the battery case was melted so that short circuits with respect to battery terminals occurred frequently.

On the contrary, according to Example, irrespective of temperature, pressure and time, the battery assembly efficiencies were excellent, that is, 100%. This is because short circuits did not occur at the case having a laminated structure according to the present invention due to the PTFE layer having excellent heat resistance and chemical resistance and having low air permeability.

According to the present invention, a short circuit generated during adhesion between edges of upper and lower portions of the case can be prevented, thereby improving the performance of a case sealing process. Also, the deterioration of the battery performance, due to micro short circuit occurring during the sealing of the case, can be avoided. Further, the case sealing process can be safely performed, irrespective of conditions of thermal fusion such as temperature, pressure or time.

What is claimed is:

1. A battery case for enclosing and hermetically sealing a battery body which generates current, comprising:

a first polyethylene terephthalate layer, which is an innermost layer with respect to a battery body, which is adhered to another part of the first polyethylene terephthalate layer when sealing the battery body;

a polymer layer on the first polyethylene terephthalate layer;

a second polyethylene terephthalate layer on the polymer layer; and a polypropylene layers, which is an outermost layer with respect to the battery body, on the second polyethylene terephthalate layer.

2. The case according to claim 1, wherein the polymer layer is at least one selected from the group consisting of polytetrafluoroethylene (PTFE) resin, polyimide resins, and silicone resin.

3. The case according to claim 1, wherein the thickness of the polymer layer is in the range of 10 to 50 μm.

4. The case according to claim 2, wherein the thickness of the polymer layer is in the range of 10 to 50 μm.

* * * * *